UNITED STATES PATENT OFFICE.

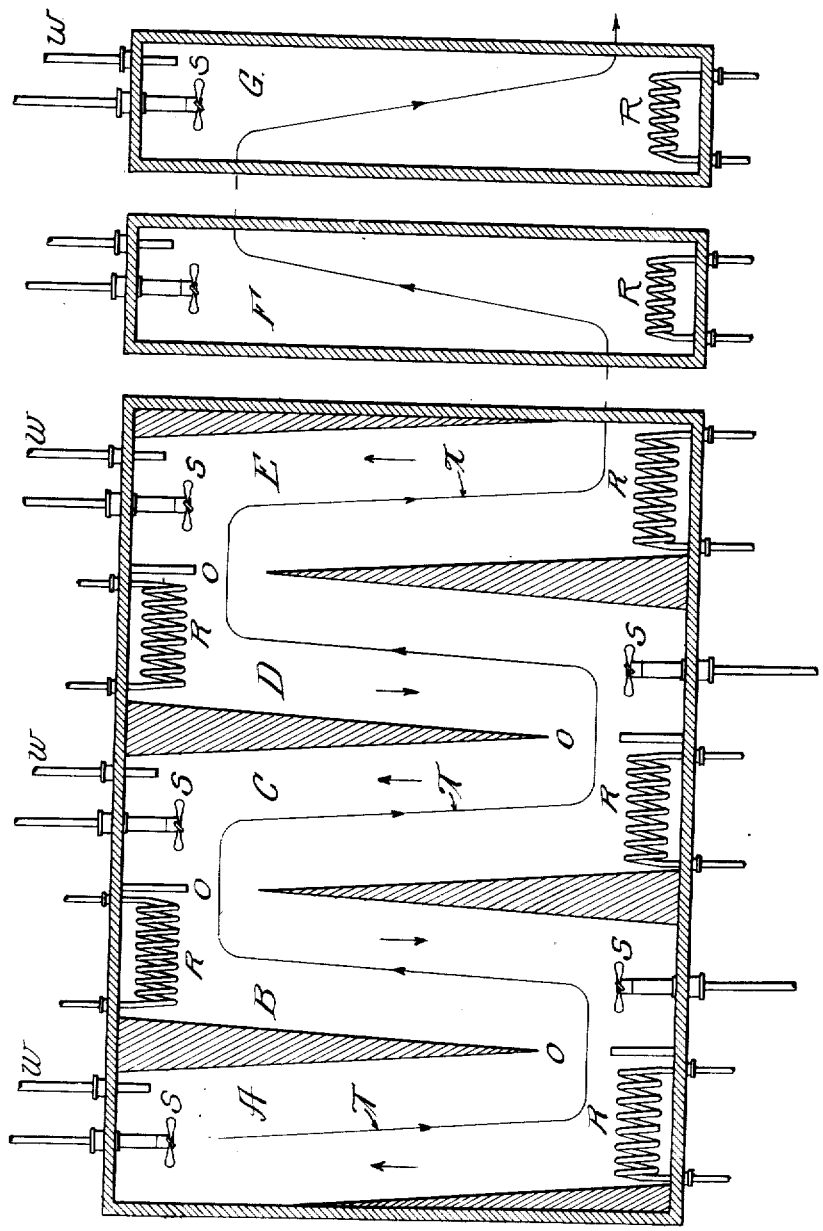

PAUL W. PETERSEN, OF CHICAGO, ILLINOIS.

METHOD OF PRESERVING COMESTIBLES.

1,420,739.

Specification of Letters Patent. Patented June 27, 1922.

Application filed February 28, 1921. Serial No. 448,333.

*To all whom it may concern:*

Be it known that I, PAUL W. PETERSEN, a subject of the Kingdom of Denmark, residing at Chicago, in the county of Cook and State of Illinois, United States of America, have invented new and useful Improvements in Methods of Preserving Comestibles, of which the following is a full, clear, concise, and exact description, reference being had to the accompanying drawing, forming a part of this specification.

My invention relates to methods for treating food commodities, particularly comestibles or watery foods such as meats, vegetables, fish, fowl, fruits and the like, that are subject to deterioration from their fresh or initial state.

More specifically my invention refers to improved methods for treating comestibles, particularly meats and allied commodities, which are to be subjected to chilling, freezing or refrigerating operations for the purpose of preserving them.

My present invention comprehends a treatment for comestibles which involves a particular operation before or while they are submitted to the chilling, freezing or refrigerating actions whereby the preserved commodities so treated will be greatly enhanced both as to their quality and keeping property. At the same time, material economies accrue by the use of my present invention, particularly in the saving of all or a substantial part of the loss of weight of the comestible resulting from evaporation.

For a more complete understanding of my present invention, it is desirable to briefly review herein the methods heretofore practiced commercially for preserving, by means of refrigeration, food commodities such as comestibles. It is, of course, a well known process to refrigerate comestibles in an environment, such as purified air, which does not give an unsavory flavor to the commodities. But when comestibiles are frozen in air they are generally pre-cooled by air before being subjected to actual freezing whereby they sustain an appreciable loss of weight by evaporation. Again, the process of refrigerating comestibles by subjecting them indirectly or directly to a frigid salt water solution is an old process. A modification of this process consists in subjecting the comestibles undergoing treatment to the direct action of a refrigerating salt solution, the temperature of which at the beginning of the treatment is at or below the freezing point of the salt solution and wherein the concentration of the salt wherein is below the point of saturation. In this fashion an initial coating of fresh ice is formed on the comestible which may be subsequently subjected to further refrigerating action.

By means of my present invention, I provide a new process which proves economical in practice and which ensures the production of preserved food commodities, such as comestibles, that will be of high quality and possess substantially the same properties as initially possessed by the fresh articles.

It is obvious that the more nearly identical the properties possessed by a chilled or frozen food product or comestible are to the properties initially possessed by the same article in its fresh state, the better will be the quality of the preserved comestible after it has been subjected to treatment. The deterioration in quality of comestibles heretofore preserved by chilling or freezing, through the agency of refrigeration, has partly been the consequence of the fact that the liquid content comprised in the comestibles has been considerably reduced by evaporation previous to and during the chilling or freezing operation. The reduction in this fashion of the liquid content of comestibles, besides impairing the quality of the comestibles, causes a considerable reduction in the weight thereof which is reckoned as a complete and total loss.

I have discovered that the quality of preserved comestibles is enhanced to a substantial degree by treating them with a liquid, for instance by immersing them, as a preliminary step, for some hours in a liquid bath which, in some instances, may be a bath of pure water. If the comestibles are subjected to a sufficiently long immersion in an appropriate liquid bath they will absorb liquid from the bath in sufficient quantities to compensate substantially for the liquid content initially contained in the fresh comestible which has been lost by evaporation. Moreover, I have discovered that when comestibles are treated or saturated with a liquid, as above specified, and pre-cooled to approximately the freezing point of water, with a loss of substantially all of their body heat, prior to being subjected to the final refrigeration operation, the comestibles will become much more rapidly incased in a thin or protective shell of ice when placed in contact with a refrigerating medium, whether the same be a liquid or gas, than if the comestibles are not so treated or saturated and pre-cooled but, for instance, merely washed or "dipped" in water previous to being subjected to the final refrigerating operation.

In this connection I wish to state that comestibles subjected to pre-cooling in a liquid, without provision for absorption from a solution cannot reap the full benefits of my invention, as it is practically impossible to deliver some comestibles, such as slaughtered meat, to the pre-cooling treatment such as a pre-cooling bath without some previous loss by evaporation sustained by its liquid content, and because it is harmful to many comestibles particularly beef, to be subjected thus to a liquid bath other than a bath possessing properties which will ensure the beef against deterioration while undergoing treatment therein.

In practicing my invention, I subject the comestible to be preserved to the direct action of a liquid in order to replenish the liquid content to substantially its initial value as contained in the fresh comestible before the liquid content has been reduced by evaporation. During the time that the comestible is being treated by this liquid, the liquid itself is preferably maintained at a low temperature in order to effect a partial or full extraction of body heat from the comestible so that when the same is subjected to the refrigerating operation the comestible will contain substantially none of its body heat above the freezing point of water. I have found that in my method of preserving some comestibles by immersing them in a liquid bath, which may sometimes be a distilled water bath, for a sufficiently long time to permit them to absorb as much liquid as they have previously lost by evaporation, the comestibles will in their preserved state possess substantially their initial fresh properties.

However, it is desirable, as mentioned above, that the preliminary treating liquid to which the commodities are to be subjected be continuously cooled, preferably to its freezing point or as near the freezing point as is practicable, in order to pre-cool the comestibles while, simultaneously, they may absorb sufficient liquid to restore their liquid contents to substantially the initial quantity and value comprised in the fresh articles.

After the comestibles have been subjected to this preliminary treatment they may then be submitted to the final refrigerating operation which may be effected by any of the usual methods. However, I prefer that the comestibles, after being treated or saturated as mentioned above, be subjected to the direct action of a refrigerating solution. I have found that the final refrigerating bath, if comprising a mixture of water and glycerine will properly refrigerate some comestibles and produce satisfactorily preserved products. Other organic materials may be used, such as alcohol, but in the treatment of meats I have found glycerine very desirable, inasmuch as it imparts no disagreeable flavor to the preserved meat.

If the preliminary treating liquid of my invention is substantially isotonic with respect to the liquid content initially comprised in the fresh comestible (for instance, in the treatment of meat, with respect to sodium chloride or to other inorganic compounds present in the tissue) a very savory preserved product may be secured which will possess substantially the initial flavor, as well as practically restore the comestible so treated to its initial constituency. In some instances, therefore, I intend that my present process of treating comestibles comprise the step of immersing them in a substantially isotonic solution which, for instance in the treatment of meat, may comprise inorganic salts. If some comestibles are immersed in a bath of pure water for their preliminary treatment prior to their final refrigeration, certain conditions impairing their quality may arise by reason of the osmotic action set up as a result of the dissimilarity between the pure water liquid bath and the liquid content comprised within the comestible. For instance, if meat is immersed in a bath of pure water, the salt comprised in the liquid content of the meat which includes the blood, will initiate an osmotic action between the liquid content comprised in the meat and the pure water bath. Under such a circumstance, the cellular tissue of the meat may deteriorate providing the meat is of such constituency as to serve in the nature of a membrane conducive to the initiation of an osmotic action. For instance, by immersing meat in a pure water bath, the pure water may effect a comprehensive bursting of the tissue cells of the meat. In order to preclude the deterioration of the meat as a consequence of having been subjected to this preliminary treatment, the solute content of the liquid found in the fresh meat may be analyzed, and from this information a substantially isotonic solution may be made for the preliminary bath.

While I have referred above, in connection with the treatment of meat, to the salt content of the preliminary treating liquid and, by this reference, have termed such a treating liquid a "substantially isotonic bath" it may be found desirable under certain conditions to have the preliminary bath comprise materials in solution other than salt, it being my aim, of course, to provide a preliminary bath the composition of which (as far as commercial operations allow and the economical practicing of them) will be substantially the same in some aspects as the initial liquid content of the comestibles to be subjected to treatment. By immersing a comestible in a substantially isotonic bath, the original liquid content initially found within the fresh comestible will be substantially present after the comestible has undergone the complete treatment. When meat is so treated, the salt content initially comprised in the liquid content of the fresh meat will be present in its substantially original value and quantity. Meat so treated and thereafter subjected to a gaseous freezing operation may still lose weight by evaporation, but the total loss of weight from the time of slaughtering to the finished freezing of the meat will be materially reduced.

By the terms "isotonic solution" or "isotanic bath" as employed herein and in connection with the practicing of my invention, I do not comprehend solutions that are necessarily chemically identical to the initial liquid content of the particular comestible undergoing my treatment, but I do refer to a solution or bath that possesses certain properties which are substantially similar to the liquid content of the comestible and which are capable of fulfillment in a practical sense for economical and commercial operations. These certain properties may vary with different comestibles and different modes of treating them as well as with the character of the finished product. In many cases, the bath may be so constituted that it is iso-osmotic with the liquid content of the comestible undergoing treatment. Again, a suitable bath may be one which is electrically neutral or iso-electric to the initial liquid content of the comestible undergoing treatment. In the foregoing cases, the bath in all instances is what I have herein designated as being an "isotonic bath" to distinguish from a bath that is chemically identical to the liquid content of the comestible. In every instance, the bath that I have designated isotonic, is one which preserves the comestible in substantially such condition as to color, texture, consistency, etc., that will make the preserved comestible a commercial product. Again to illustrate, in the commerical treatment of meat in accordance with my invention, it may be that the various kinds of meat are sufficiently alike so that the same substantially isotonic bath may be used for all of them. Again, the isotonic bath may comprise certain ingredients and materials only and in such proportions as are found to be desirable for commercial treatment, the character of such a solution being substantially isotonic as distinguished from a solution possessing properties making it chemically identical to the liquid comprised in the fresh comestible before being subjected to any treatment whatsoever. A liquid possessing properties substantially isotonic to the liquid content initially present in fresh meat may, for instance, comprise water and any one or more of the following solutes, sodium chloride, calcium chloride, magnesium chloride, potassium chloride, glycerine, alcohol, etc.

While I have herein referred to the pre-cooling of the comestibles before subjecting them to the refrigerating operation, I propose that the isotonic bath be cooled so that the comestibles will be simultaneously pre-cooled while they are undergoing the preliminary treatment or saturation therein.

When treating some comestibles by subjecting them to the direct action of a liquid, not only an osmotic action may arise but also a spongy action which may cause the comestibles to become unduly saturated or supersaturated by reason of their cellular or tissue structure. In certain instances, it may not be undesirable for the comestibles to have a slight spongy action but, becoming so to any large degree, may have a deleterious effect upon the comestibles. I have found it desirable, therefore, in some cases to comprise as a solute in the treating liquid a material having an astringent property. To illustrate, glycerine has inherently an astringent property and when the treating liquid comprises glycerine, the said comestible when treated by such a treating liquid may be subject to an osmotic action but becomes spongy to only a slight and harmless degree since the astringent solute or glycerine serves to close the pores of the comestible.

While comestibles, and particularly meat, may be successfully chilled or pre-cooled in accordance with my invention, by subjecting the meat to a substantially isotonic liquid comprising one or more of various crystalloids as the solute or solutes, satisfactory chilling or pre-cooling may also be obtained by subjecting the meat to the direct action of a solution, not necessarily substantially isotonic, in which an organic material with inherent astringent properties, such as glycerine, is the solute.

During the time that the comestible is immersed in the isotonic bath the comestible is absorbing water from the bath. As a consequence, the concentration of the bath will increase and it may be found desirable, therefore, to add water so as to maintain the bath at the proper concentration throughout the treatment of the comestible. This is particularly true where large quantities of comestibles of the same kind are being continuously supplied to, and withdrawn from, the isotonic bath.

In the accompanying drawing I have shown diagrammatically a form of apparatus by means of which my process of preserving comestibles may be carried out. A large vat is divided into a series of side by side compartments, A, B, C, D, E, the number of compartments comprising this series being increased or decreased to suit operating conditions. Each compartment is more or less a complete pre-cooling or chilling unit although some are connected ad seriatim at alternate ends through openings O. For each of said compartments there is severally provided an agitating device S and a refrigerating coil R. The line T, by the arrow heads affixed thereto, indicates the direction in which the comestible undergoing treatment is to be transferred from compartment to compartment. The arrows indicate the direction in which it is desirable to circulate the liquid in contact with the comestibles and contained within the compartments A, B, C, D, E, by means of the agitators S. It will be observed that the liquid baths in the separate compartments are in direct contact with the refrigerating coils R and that the circulation of the liquid in contact with the comestibles is opposite to the movement therethrough of the comestible undergoing treatment. The temperatures of the bath in the several compartments may be the same. Again the temperature of the liquid bath of each succeeding compartment may be lower than the temperature of the bath of the preceding compartment. On this occasion it will be noted that in its preliminary treatment the comestible is first subjected to the compartment A, containing a bath of highest temperature, and is gradually transferred, as it travels through the other compartments, B, C, D, E, to increasingly lower temperatures. While the comestible is being chilled or pre-cooled in the compartments, A, B, C, D and E so as to extract practically all of its body heat above the freezing point, the comestible at the same time, is being saturated or treated in the substantially isotonic bath into which it is immersed.

In order to maintain the solution forming the preliminary bath substantially isotonic at all times as the comestible continues to absorb water therefrom, supply pipes W are provided in order to furnish water to the isotonic bath in properly regulated quantity so that the bath will be maintained at its proper concentration while the comestible or comestibles are being subjected thereto.

From the preliminary treatment that is conducted in the compartments A, B, C, D and E, the comestible may or may not then be immersed in a bath F that is preferably of pure or distilled water. The period of time for which the comestible is immersed in the bath F should be of short duration only so as to wash the surface of the comestible and to substantially cleanse it of the isotonic bath from which it has just been received and in order that the coating of fresh water may in turn freeze to a protective coating of fresh ice when the comestible is subjected substantially immediately to the freezing operation. The time of immersion in the rinsing bath F should be so limited as to preclude the possibility of osmotic action to any appreciable degree. From the rinsing bath F, the comestible may then be submitted to a refrigerating operation, which I have shown for convenience as a refrigerating bath G which contains the freezing solution. The comestible may be retained in the bath G until it has been completely frozen, or it may be removed to a separate freezer or to storage at any stage of the entire process.

By subjecting the comestibles to the cleansing bath F any materials or solutes, such as salt, glycerine, etc. comprised in the prior isotonic bath will be washed from the surface of the comestible and thereafter the solute is precluded from permeating into the body of the comestible during storage in a chilled or frozen state. Again, this pure water bath prevents concentration of any salt or other material on the surface of the comestible, and ensures that the chilled or frozen meat will have substantially the properties possessed by the meat in its initially fresh state.

While the foregoing process, in its specific details, may be particularly adapted to the treatment of meat, it is to be understood that very satisfactory results may be obtained in the treatment of some comestibles by immersing them in a preliminary bath of pure water wherein they may become saturated to a degree substantially commensurate with the liquid that has been lost by evaporation. It is quite apparent that this preliminary bath need not serve as a pre-cooling bath for the comestible, if the comestible is pre-cooled in other ways, but it is highly economical to conduct the pre-cooling simultaneously with the saturating of the comestible in this fashion. Under certain conditions, the cleansing bath F may be dispensed with, particularly when the preliminary bath contains no materials likely to be detrimental to the quality of the preserved comestible or to affect the final refrigerating operation, which may be conducted under the action of a freezing liquid bath G, as described, or under the action of a freezing gas. This preliminary treatment may consist of subjecting the comestible, such as meat, to the direct action of a treating liquid comprising pure water and glycerine which may also be cooled for the purpose of pre-cooling or chilling the comestible. In the chilling of comestibles, such as meat, this above mentioned preliminary bath or treatment, with or without the cleansing bath F constitutes the complete operation conducted in accordance with my invention. The term "chilling" in this art has a well defined meaning and implies that the meat has had its temperature reduced to very nearly the point at which "freezing" occurs, without actual freezing taking place. "Pre-cooling" covers substantially the same operation but meat is pre-cooled only when it is to be afterwards frozen.

It is obvious that the final refrigerating operation may be any of the usual methods. In the description above, I have stated that the bath G may comprise organic material, such a glycerine, but it will be apparent that this organic content is not necessary, even in the treatment of meat since other solutions, organic or inorganic, may suffice for the final refrigerating operation. The bath G, when such a step is used to effect the freezing of the comestible being treated, may comprise as the inorganic content a calcium salt, sodium salt, potassium salt, glycerine, alcohol and other crystalloids as solutes. In some instances, the freezing or refrigerating bath G may comprise several such crystalloid solutes, depending upon the comestible being treated, as well as other conditions that may arise under each particular circumstance.

By reason of the treatment conducted in the compartments A, B, C, D and E, the comestible is substantially saturated and its liquid content substantially replenished to its original value. At the same time, the comestible has been chilled or pre-cooled, preferably to the point where it has lost all of its body heat.

If the isotonic bath contained within the compartments A, B, C, D and E serves as a chilling medium, the baths F may and the operation effected in compartment G will be dispensed with.

From the foregoing it will be seen that my present process of preserving food commodities, particularly comestibles, comprises subjecting them to the direct action of a liquid, preferably having substantially isotonic properties, in order to restore the liquid content of the comestible to substantially its initial quantity and value. For economic reasons it is found advantageous in many cases to have this liquid both serve simultaneously as a pre-cooling or chilling medium for the commodity.

While I have herein described my invention in detail, it is understood that many modifications may be made therein without departing from the spirit of the appended claims and I desire, therefore, that such limitations only be placed upon my invention as are required by the prior art and set forth specifically in the appended claims.

Having thus described my invention, what I now claim as new and desire to secure by Letters Patent is:

1. In the art of preserving meat and other comestibles by refrigeration, the method which comprises pre-cooling the comestible by immersion in a liquid bath to remove substantially all of its body heat and then subjecting the comestible to a refrigerating operation.

2. In the art of preserving meat and other comestibles by refrigeration, the method which comprises pre-cooling the comestible by immersion in a liquid bath to replace by absorption and without deleterious penetration by undesirable solutes a portion of the liquid content of the comestible lost by evaporation and to pre-cool the comestible and then subjecting the comestible to a refrigerating operation.

3. In the art of preserving meat and other comestibles by refrigeration, the method which comprises pre-cooling the comestible by immersion in a substantially isotonic bath to saturate without deleterious penetration by undesirable solutes and to remove substantially all of the body heat from the comestible and then subjecting the comestible to a refrigerating operation.

4. In the art of preserving by refrigeration, the process of treating meat and other comestibles which comprises immersing the comestible in a chilling and pre-cooling liquid bath that possesses properties substantially isotonic to the initial liquid content of the comestible whereby the comestible is pre-cooled and, at the same time, the liquid content thereof is restored to substantially its initial value and composition and then subjecting the comestible to a refrigerating operation.

5. The process of preserving meat and other comestibles which consists in subjecting the comestible to a liquid substantially isotonic bath to restore the liquid content thereof to substantially its initial value without deleteriously affecting the comestible and then subjecting the comestible to a refrigerating bath comprising organic material.

6. The process of preserving meat and other comestibles by refrigeration which consists in immersing the comestible in a substantially isotonic bath to restore the comestible to substantially its original state and composition and then immersing the comestible in a refrigerating bath comprising organic material wherein said comestible is frozen.

7. The process of preserving a comestible by refrigeration which consists in immersing the comestible in a pre-cooling substantially isotonic liquid bath, and then when in a cooled and substantially saturated state immersing said comestible in a liquid refrigerating bath comprising organic material.

8. The process of preserving meat by refrigeration which consists in immersing it in a pre-cooling bath comprising a salt content, said salt content of the bath being substantially the same as that comprised in the initial liquid content of the fresh meat, and then when said meat is in a substantially saturated and pre-cooled condition, subjecting it to a refrigerating operation.

9. The process of preserving a comestible by refrigeration which consists in immersing the comestible in a substantially isotonic and pre-cooling liquid bath, then subjecting it for a relatively short period of time to a cleansing bath in order to wash the isotonic bath from the surface of the comestible, and then subjecting said comestible to a refrigerating operation.

10. The process of preserving a comestible by refrigeration which consists in treating the comestible to restore the liquid content thereof to substantially its initial value and essential composition, then treating the comestible to prevent penetration thereof by undesirable solutes and then refrigerating said comestible.

11. The process of preserving meat and other comestibles by refrigeration which consists in treating the comestible in a liquid bath to restore the liquid content of the comestible to substantially its initial value and essential composition without deleteriously affecting the comestible and, simultaneously therewith pre-cooling the comestible, then treating the comestible to prevent penetration thereof by undesirable solutes and then refrigerating said comestible.

12. The process of preserving meat and other comestibles by refrigeration which consists in subjecting the comestible to the direct action of a substantially isotonic liquid in order to restore the liquid content of the comestible to substantially its initial value, and then subjecting the comestible to a refrigerating operation.

13. In the art of preserving by refrigeration, the process of treating meat and other comestibles which comprises subjecting the comestible to the direct action of a pre-cooling liquid that possesses properties substantially isotonic to the initial liquid content of the comestible whereby the same is pre-cooled and the liquid content thereof is partially restored, and then subjecting the comestible to a refrigerating operation.

In witness whereof, I have hereunto subscribed my name.

PAUL W. PETERSEN.

Witnesses:
GEO. W. HANSEN,
LAURA M. SCHNEIDER.

Certificate of Correction.

It is hereby certified that in Letters Patent No. 1,420,739, granted June 27, 1922, upon the application of Paul W. Petersen, of Chicago, Illinois, for an improvement in "Methods of Preserving Comestibles," errors appear in the printed specification requiring correction as follows: Page 3, line 7, for the word "bath" read *treating liquid;* page 4, line 98, for the word "material" read *solute;* and that the said Letters Patent should be read with these corrections therein that the same may conform to the record of the case in the Patent Office.

Signed and sealed this 19th day of September, A. D., 1922.

[SEAL.] 
WM. A. KINNAN,
*Acting Commissioner of Patents.*